(12) United States Patent
Kollmann et al.

(10) Patent No.: US 11,504,654 B2
(45) Date of Patent: Nov. 22, 2022

(54) RING FILTER ELEMENT

(71) Applicant: Mahle International GmbH, Stuttgart (DE)

(72) Inventors: Andreas Kollmann, Eitweg (AT); Patrick Wieler, Urbach (DE)

(73) Assignee: Mahle International GmbH

( * ) Notice: Subject to any disclaimer, the term of this patent is extended or adjusted under 35 U.S.C. 154(b) by 126 days.

(21) Appl. No.: 16/803,622

(22) Filed: Feb. 27, 2020

(65) Prior Publication Data

US 2020/0276521 A1 Sep. 3, 2020

(30) Foreign Application Priority Data

Feb. 28, 2019 (DE) .................... 10 2019 105 142.8

(51) Int. Cl.
*B01D 29/00* (2006.01)
*B01D 35/30* (2006.01)

(52) U.S. Cl.
CPC .......... *B01D 29/0011* (2013.01); *B01D 35/30* (2013.01); *B01D 2201/291* (2013.01); *B01D 2201/4023* (2013.01)

(58) Field of Classification Search
CPC ................ B01D 29/0011; B01D 35/30; B01D 2201/4023; B01D 2201/291; B01D 29/15; B01D 35/153; B01D 35/16; B01D 27/08; B01D 2201/29; B01D 2201/30; B01D 2201/40; B01D 2201/308; B01D 2201/301
USPC .............................. 210/233–235, 450, 493.2
See application file for complete search history.

(56) References Cited

U.S. PATENT DOCUMENTS

2013/0062270 A1* 3/2013 Braunheim .......... B01D 36/003
                                                              210/236

FOREIGN PATENT DOCUMENTS

DE          88 06 694 U1    9/1989
DE    10 2011 110 124 B3   10/2012

OTHER PUBLICATIONS

English abstract for DE-10 2011 110 124.

* cited by examiner

*Primary Examiner* — Madeline Gonzalez
(74) *Attorney, Agent, or Firm* — Fishman Stewart PLLC

(57) ABSTRACT

A ring filter element for a filter device may include a connecting region and an axially projecting pin. The pin may include an arm via which the pin is connected to the connecting region. The arm may include a predetermined breaking point disposed spaced apart from the connecting region.

20 Claims, 1 Drawing Sheet

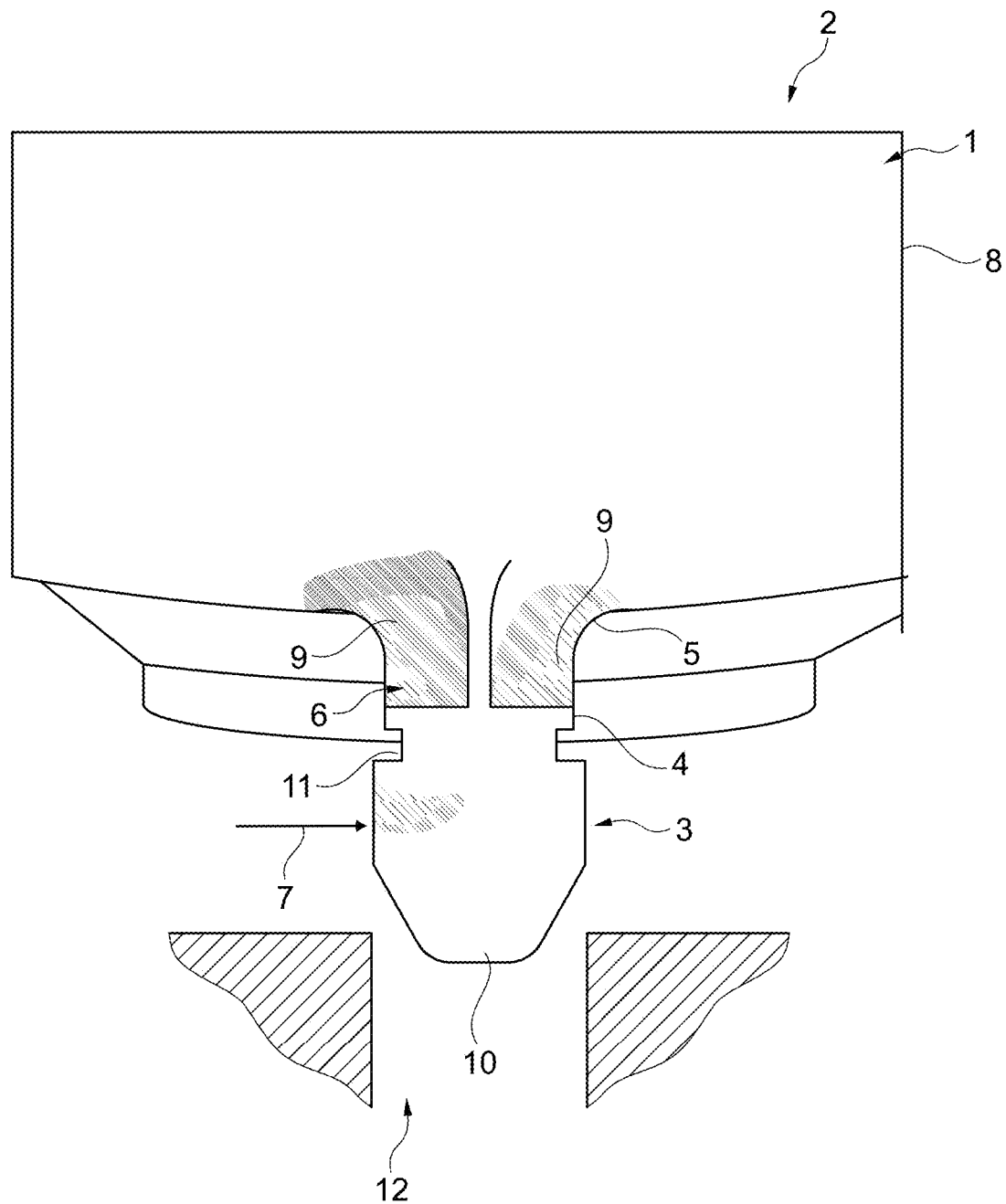

RING FILTER ELEMENT

CROSS-REFERENCE TO RELATED APPLICATIONS

This application claims priority to German Patent Application No. DE 10 2019 105 142.8, filed on Feb. 28, 2019, the contents of which are hereby incorporated by reference in their entirety.

TECHNICAL FIELD

The present invention relates to a ring filter element for a filter device having an axially projecting pin. In addition, the invention relates to a filter device having such a ring filter element.

BACKGROUND

From DE 88 06 694 U1 a filter device having a water storage space arranged at the bottom, on which for draining the accumulated water a drain screw is present. This drain screw has a predetermined breaking point.

From DE 10 2011 110 124 B3 a filter device is likewise known, which has a filter housing composed of at least two housing parts. In addition to this, the filter device comprises a releasable locking device for connecting the two housing parts with a locking pin, which comprises at least one one-way snap-in element, which in a locking position of the locking pin is snapped into a corresponding mating snap-in element of the one housing part and which has a predetermined breaking point, which breaks when the locking pin is unlocked.

In generic ring filter elements, the pin that is usually moulded onto a dirt bowl or to a lower end disc is necessary in order to close a filter housing-side passage, for example a drainage passage. The pin and the associated passage function in the manner of a key-lock principle. Such a pin is often designed in one piece with the lower end disc or a dirt bowl of the ring filter element.

Disadvantageous with the ring filter elements known from the prior art however is that with excessively high transverse forces onto the pin, the same can break off, wherein a breaking off often occurs on a connecting region of the pin on the ring filter element, i.e. on the lower end disc of the same or on the dirt bowl of the same. This can create cracks in the lower end disc or in the dirt bowl which make possible an undesirable bypass flow from a raw side to a clean side of the ring filter element, which is to be avoided at all cost.

SUMMARY

The present invention therefore deals with the problem of stating an improved or at least an alternative embodiment for a ring filter element of the generic type, which in particular overcomes the disadvantage known from the prior art.

According to the invention, this problem is solved through the subject of the independent claim(s). Advantageous embodiments are subject of the dependent claim(s).

The present invention is based on the general idea of providing a predetermined breaking point on the pin with a ring filter element known per se for a filter device having an axially projecting pin and arranging the same in such a manner that a breaking-off of the pin in the event of an excessive transverse force acting on the same, does not result in damage to a lower end disc or a dirt bowl, but exclusively in the breaking-off of the pin. Here, the ring filter element according to the invention comprises the axially projecting pin, which comprises an arm, via which it is tied to a connecting region on the ring filter element. According to the invention, this arm now comprises a predetermined breaking point that is spaced apart from the connecting region. Through the spaced-apart arrangement of the predetermined breaking point from the connecting region, an occurrence of cracks on the connecting region and thus a damage to a lower end disc or a dirt bowl of the ring filter element can be prevented, so that no undesirable bypass flow from a raw side to a clean side of the ring filter element occurs. Should the pin break in the process, provided the same is already plugged into a filter housing-side passage, for example a drain passage, the filter device comprising the ring filter element functions without problems pending the replacement of the ring filter element during the next maintenance, since the pin that is arranged in the filter housing-side passage and broken off, seals the same and at the same time the breaking point of the pin is so far away from the connecting region on the ring filter element that no cracks can occur there. Thus, with the ring filter element according to the invention, an occurrence of excessive transverse forces on the pin can be converted into a simple breaking-off of the pin without damage of the ring filter element or a cancellation of the separation between raw and clean side having to be feared.

In an advantageous further development of the solution according to the invention, the arm is cruciform in the cross section. By way of this it is possible with extremely low material expenditure to achieve a comparatively high stiffness of the arm, wherein via the cruciform cross section high bending forces can also be additionally absorbed. By way of such a cruciform cross section, the predetermined breaking point can be realised comparatively easily since for example the webs forming the cruciform cross section are tapered in the region of the predetermined breaking point.

In an advantageous further development of the solution according to the invention, the pin on its free end comprises a closure element, in particular a head. Such a closure element can be larger in the outer diameter than the arm following thereon, as a result of which an always free and simple sliding-in of the closure element into the filter housing-side passage is possible.

Practically, an annular groove for receiving an O-ring seal is arranged on the closure element. By way of such an annular groove, an O-ring seal can be comparatively easily yet reliably fixed on the closure element, wherein it is obviously also conceivable, alternatively, that on the closure element a sealing lip that is formed in one piece with the same is arranged, in particular injection moulded on, by way of which the sealing of the filter housing bowl-side passage is effected. By way of this, the parts variety and thus also the assembly expenditure resulting from this could be reduced.

Practically, the pin is formed in one piece with a dirt bowl or a lower end disc of the ring filter element. By way of this, not only a high-quality but also a cost-effective production of the pin, for example by means of a plastic injection moulding method can be made possible. At the same time, a subsequent mounting of the pin on the ring filter element can be avoided through this type of production at the same time.

The present invention is based on the general idea, furthermore, of stating a filter device having a ring filter element arranged in a filter housing according to the preceding paragraphs, wherein in the filter housing a passage that is formed complementarily to the pin is provided, which during the operation of the filter device has to be sealed off by the pin in order to be able to ensure a perfect functioning of the filter device. The advantages of the predetermined breaking point arranged on the arm of the pin can thus be transferred to the filter device. The same can be formed for example as oil filter or as fuel filter.

Further important features and advantages of the invention are obtained from the subclaims, from the drawing and from the associated FIGURE description by way of the drawing.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

A preferred exemplary embodiment of the invention is shown in the drawing and is explained in more detail in the following description.

The FIGURE shows a ring filter element according to the invention and a filter device according to the invention.

DETAILED DESCRIPTION

According to the FIGURE, a ring filter element 1 according to the invention for a filter device 2 which is not shown in more detail, comprises for example a fuel filter or an oil filter, comprises an axially projecting pin 3 comprising an arm 4, via which it is connected to a connecting region 5 on the ring filter element 1. According to the invention, the arm 4 now comprises a predetermined breaking point 6 spaced apart from the connecting region 5. The same brings about that with a corresponding transverse force 7 the pin 3 no longer breaks in the region of the connecting region 5, but spaced apart from the same, and because of this cracks on a lower end disc or a dirt bowl 8 of the ring filter element 1, which could result in an undesirable bypass flow, are avoided.

Viewing the pin 3 or the arm 4 of the same further it is noticeable that the arm 4 is cruciform in the cross section and formed from webs 9 that substantially run rectangularly relative to one another. These webs 9 can comprise a cross-sectional taper in the region of the predetermined breaking point 6, as a result of which a breaking of the pin 3 at a predefined transverse force 7 in the region of the predetermined breaking point 6 is enforced. In order to amplify this effect, the webs 9 in the connecting region 5 can be additionally formed rounded or reinforced, as a result of which an undesirable breakage of the pin in the application region 5 can be likewise avoided.

At its free end, the pin 3 can comprise a closure element 10, in particular a head, on which for example an annular groove 11 for receiving an O-ring seal which is not shown is arranged. Obviously it is also conceivable, alternatively, that the closure element 10, without additional O-ring seal, sealingly engages in a filter housing-side passage 12, for example a drainage passage.

Preferentially, the pin 3, together with its arm 4 from the closure element 10, is additionally formed in one piece with the dirt bowl 8 or a lower end disc of the ring filter element 1, as a result of which in particular the production of the ring filter element 1 can be rendered more cost-effectively, since a subsequent mounting of the pin 3 on the dirt bowl 8 is not required.

Here, the ring filter element 1 can be installed in a filter device 2 which on the bottom side or filter housing side comprises the previously described passage 12. Operation of the filter device 2, which is formed for example as oil filter or fuel filter, can take place exclusively provided that the pin 3 with its closure element 10 is sealingly inserted into the passage 12.

In principle, two different cases are distinguished here.

Should the pin 3 break off even before the same has been inserted into the passage 12, the closure element 10 lies somewhere in the filter device 2 and a closing of the passage 12 cannot take place, as a result of which a functioning of the filter device 2 becomes impossible. Should, by contrast, the pin 3 break off with the closure element 10 already inserted into the passage 12, the predetermined breaking point 6 according to the invention brings about that the arm 4 breaks paced apart from the connecting region 5, and because of this no cracks, for example in the dirt bowl 8, are generated which would result in an undesirable bypass from a raw side to a clean side of the ring filter element 1.

With the ring filter element 1 according to the invention and the filter device 2 according to the invention, an undesirable bypass flow can thus be reliably and cost-effectively avoided.

The invention claimed is:

1. A ring filter element for a filter device, comprising:
   a connecting region;
   an axially projecting pin including an arm via which the pin is connected to the connecting region;
   wherein the arm includes a predetermined breaking point disposed spaced apart from the connecting region;
   wherein the predetermined breaking point is structured as a cross-sectional tapering;
   wherein a free end of the pin includes a closure element; and
   wherein an outer diameter of the closure element is larger than an outer diameter of the arm.

2. The ring filter element according to claim 1, wherein the arm has a cruciform cross section.

3. The ring filter element according to claim 1, wherein the arm includes four webs, and wherein the four webs at least one of:
   merge into the connecting region in a rounded-off manner; and
   are reinforced.

4. The ring filter element according to claim 3, wherein:
   the four webs each have a width extending in a circumferential direction; and
   at least one web of the four webs includes a portion in which the width decreases in a direction extending away from the connecting region.

5. The ring filter element according to claim 1, wherein the closure element includes an annular groove configured to receive an O-ring seal.

6. The ring filter element according to claim 5, wherein the annular groove is disposed directly between and separates the arm and the closure element.

7. The ring filter element according to claim 1, wherein a one-piece sealing lip is moulded onto the closure element.

8. The ring filter element according to claim 1, further comprising a dirt bowl, wherein the pin is integrally provided with the dirt bowl.

9. The ring filter element according to claim 1, further comprising a lower end disc, wherein:
   the pin is integrally provided with the lower end disc; and
   the predetermined breaking point is structured as a cross-sectional tapering.

10. The ring filter element according to claim 1, wherein:
    the arm includes a portion defined by four webs; and the four webs are connected to one another such that the arm has a cruciform cross section.

11. The ring filter element according to claim 10, wherein the four webs are tapered in a region of the predetermined breaking point.

12. The ring filter element according to claim 10, wherein the four webs respectively merge into the connecting region such that a rounded transition is defined therebetween.

13. The ring filter element according to claim 1, wherein the closure element is structured as a head.

14. The ring filter element according to claim 1, wherein:
the closure element has a tapered end portion with an axial end face; and
an outer diameter of the arm is larger than an outer diameter of the axial end face.

15. The ring filter element according to claim 1, wherein:
the closure element has a tapered end portion with an axial end face;
the closure element includes an annular groove configured to receive an O-ring seal; and
an outer diameter of the annular grove is larger than an outer diameter of the axial end face.

16. The ring filter element according to claim 1, wherein a free end of the closure element has a truncated cone shape.

17. A filter device, comprising a filter housing and a ring filter element arranged in the filter housing, the ring filter element including:
a connecting region;
an axially projecting pin including an arm, the arm connecting the pin to the connecting region and including a predetermined breaking point disposed spaced apart from the connecting region;
wherein a free end of the pin includes a closure element having a tapered end portion;
wherein an outer diameter of the closure element is larger than an outer diameter of the arm;
wherein the filter housing includes a passage structured complementarily to the pin; and
wherein operation of the filter device is exclusively possible when the pin engages in and closes the passage.

18. The filter device according to claim 17, wherein the filter device is structured as one of an oil filter and a fuel filter.

19. The filter device according to claim 17, wherein the passage is a drainage passage.

20. A ring filter element for a filter device, comprising:
a connecting region;
an axially projecting pin including an arm, the arm connecting the pin to the connecting region;
the arm including a predetermined breaking point disposed spaced apart from the connecting region;
wherein at least a portion of the arm is defined by a plurality of webs structured and arranged to provide the arm with a cruciform cross section;
wherein the plurality of webs each have a width extending in a circumferential direction; and
wherein at least one web of the plurality of webs includes a portion in which the width decreases in a direction extending away from the connecting region.

* * * * *